Figure 1:
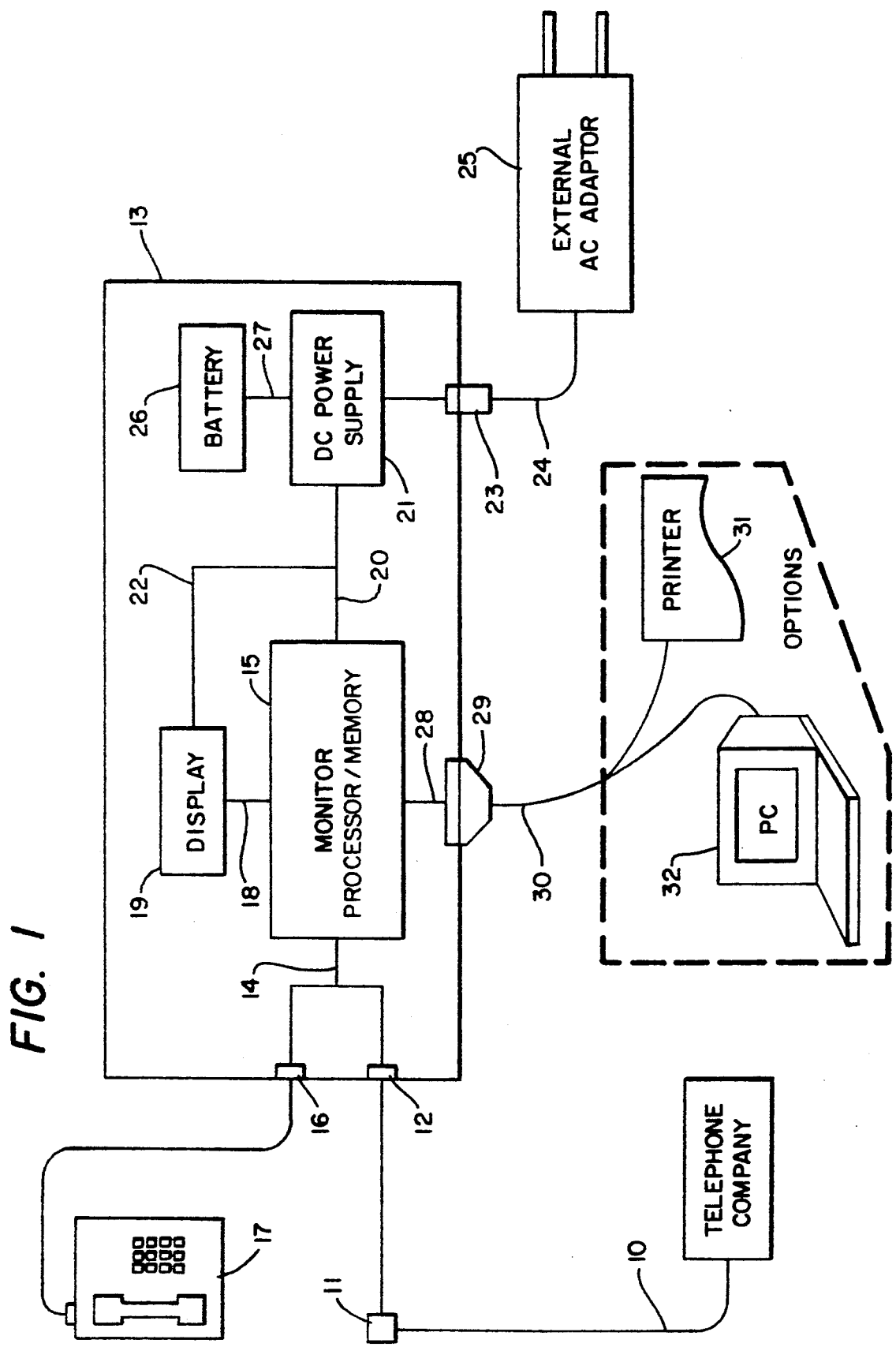

United States Patent [19]

Beckman

[11] Patent Number: 5,146,490
[45] Date of Patent: Sep. 8, 1992

[54] PASSIVE TELEPHONE LINE MONITORING SYSTEM

[75] Inventor: Alfred J. Beckman, Plano, Tex.

[73] Assignee: Primo Microphones, Inc., McKinney, Tex.

[21] Appl. No.: 708,310

[22] Filed: May 31, 1991

[51] Int. Cl.$^5$ .................. H04M 15/04; H04M 15/08; H04M 15/10; H04M 15/38

[52] U.S. Cl. .................................... 379/113; 379/140

[58] Field of Search ............... 379/135, 112, 113, 133, 379/140, 139

[56] References Cited

U.S. PATENT DOCUMENTS

| | | | |
|---|---|---|---|
| 4,656,657 | 4/1987 | Hunsicker | 379/140 |
| 4,712,230 | 12/1987 | Rice et al. | 379/112 |
| 4,937,862 | 6/1990 | Kosich | 379/133 |

Primary Examiner—Stafford D. Schreyer
Attorney, Agent, or Firm—Warren H. Kintzinger

[57] ABSTRACT

A passive telephone line monitor is provided for keeping a log of telephone line activity, both incoming and outgoing, with a microcomputer (MCU) controlled by an onboard program read only memory (ROM) working with 64K bytes of random access memory (RAM) divided into 32 byte caches allowing for up to 2,000 phone call registers depending upon utilization of available space. One hundred Alpha Directory numbers can be stored from its keyboard for personalized caller identification. Upon power application, memory, input devices and registers are initialized, and time and date are entered from the monitor keypad. The microcomputer, an interrupt controlled device, detects monitor keyboard interrupt and displays the data on a liquid crystal display, and upon completion of date and time entry, the MCU clears all interrupt flags and displays current date and clock.

15 Claims, 5 Drawing Sheets

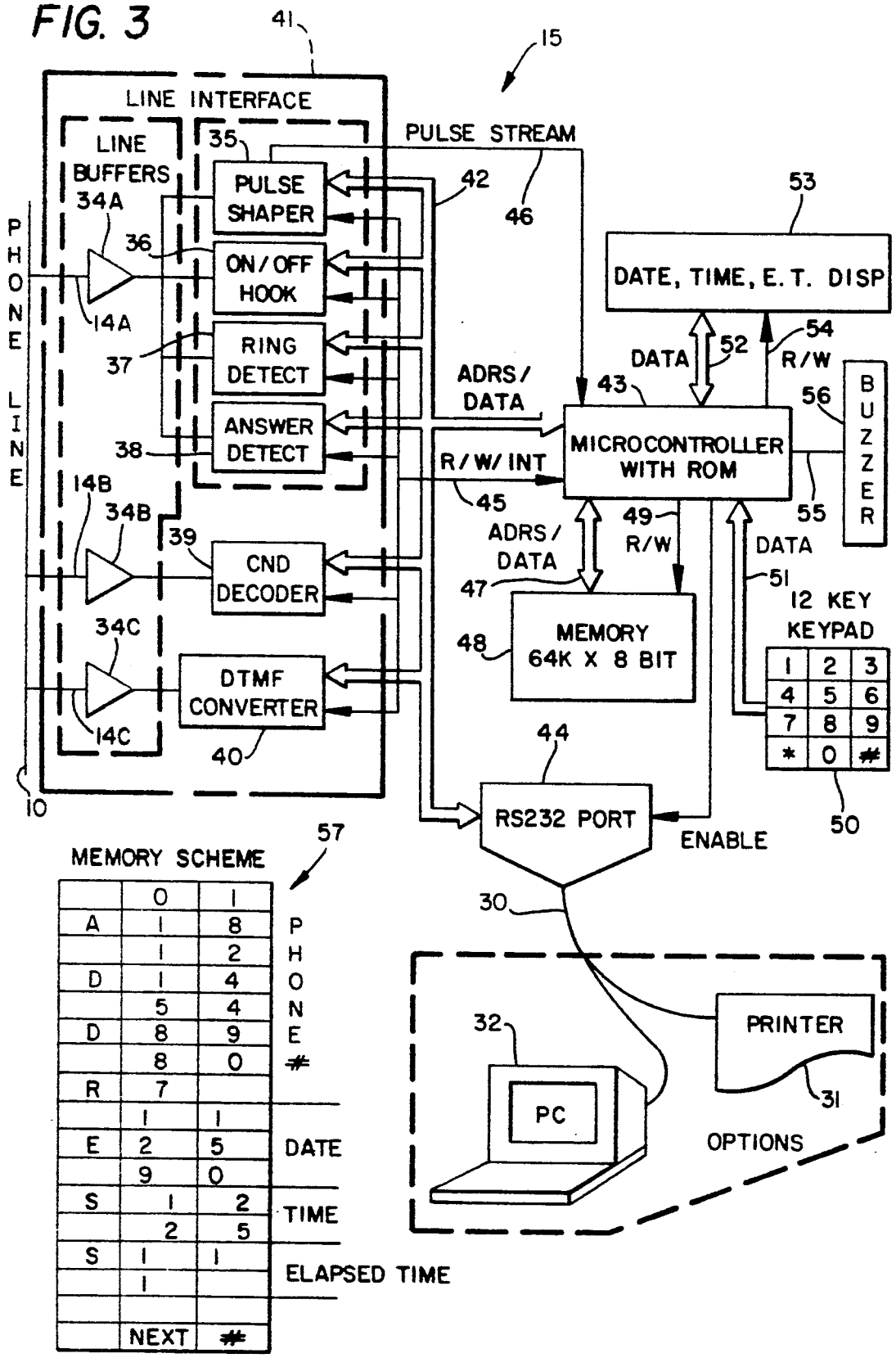

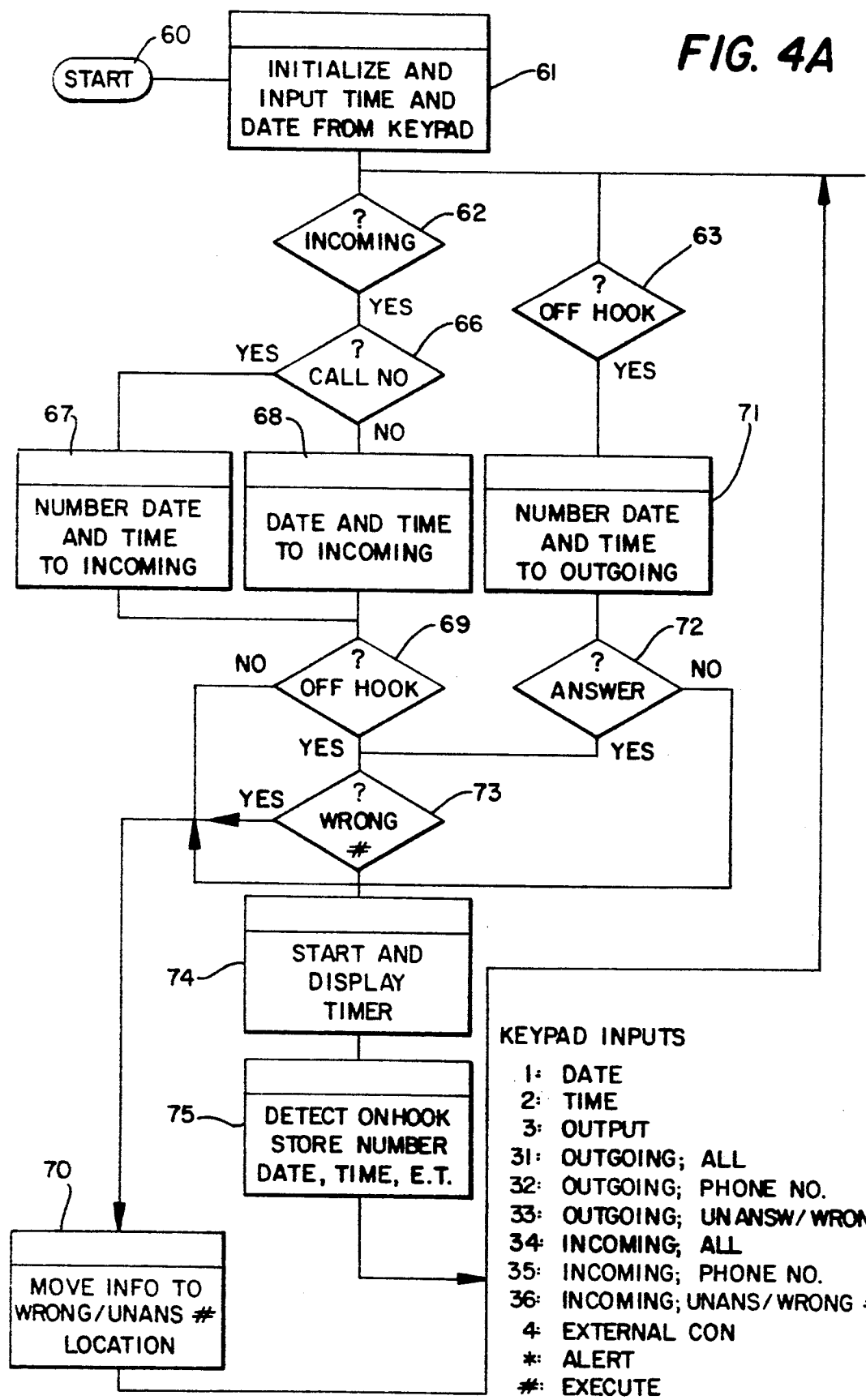

PASSIVE TELEPHONE LINE MONITORING SYSTEM

This invention relates to telephone call monitoring systems, and more particularly, to a passive electronic phone call logging system recording both incoming and outgoing phone calls with phone number, date, time and elapsed time recorded.

Among pre-existing phone call monitoring systems one system stores only one single phone transaction at any one time and relies on a printer to store historical call information so if such information is to be permanently recorded a printer must be actively attached to the system continuously. This earlier system simply cannot display historical call information since it does not have an onboard memory with a display therewith for the indication of time, date, phone number, and elapsed time, but only the present call. The previous system must be programmed from the user's phone and on outgoing calls, only the phone number is stored for future reference but only if it is printed. With this earlier system only present time incoming calls, date, time and elapsed time are printed and/or displayed.

It is, therefore, a principal object of this invention to provide an electronic logging system for recording both incoming and outgoing phone calls with phone number, time date and elapsed time recorded.

Another object is to provide such an electronic logging system also recording phone number, date and time of unanswered incoming and outgoing phone calls.

Still another object is to display a number being dialed and the completed dialed number and elapsed time of call in continuously updated form.

A further object is to record incoming calls "called number delivery number" with the incoming number displayed and recorded along with date and time.

Still another object is to provide such a system with the memory stored names, of selected callers, display indicated in place of numbers.

Another object is to provide print out of monitored phone information upon demand at any time, optionally, via a RS 232 port to an external printer when provided and actuated.

A further object is for all phone call monitored data to be down loadable (dumped) to a PC for further data manipulation (working analysis).

Still another object is to provide such a phone call electronic logging system wherein desired information can be called upon for display (LCD) in various ways by phone number, data, and/or callers name (if there).

Features of the invention useful in accomplishing the above objects include, in a passive telephone line electronic phone call monitor for keeping a log of both incoming and outgoing telephone activity, a microcomputer (MCU) controlled by an onboard program read only memory (ROM) working with 64K bytes of random access memory (RAM) divided into 32 byte caches allowing for up to 2,000 phone call registers depending upon utilization of available space. One hundred Alpha Directory numbers can be stored from its keyboard for personalized IDentification. Upon power application, memory, input devices and registers are initialized, and time and date are entered from the monitor keypad. The microcomputer, an interrupt controlled device, detects monitor keyboard interrupt and displays the data on a liquid crystal display, and upon completion of date and time entry, the MCU clears all interrupt flags and displays current date and clock. The new system is a keyboard controlled passive consumer phone monitor with digital display. It is designed to monitor a phone line's activity and store the information in memory for future reference. It is installed on a phone line to be monitored and will in no wall affect the user's phone operation. Activities monitored are outgoing calls (date, time, phone number called and elapsed time). Unanswered calls and wrong numbers, both incoming and outgoing, are also recorded with the latter being a judgement call depending on a set minimum time duration of the call. A new "caller identification" option, available in some areas is accomodated by the new system. Uses of the system include comparison with the phone company's bill to insure its accuracy; monitoring family phone conversion activity, limiting call time by constantly displaying elapsed time, thus saving money on long distance calls, observing the phone number of callers before answering. There are many uses for the system that can be almost unlimited, in accord with a consumer's needs.

A specific embodiment representing what is presently regarded as the best mode of carrying out the invention is illustrated in the accompanying drawings.

Figure 2:
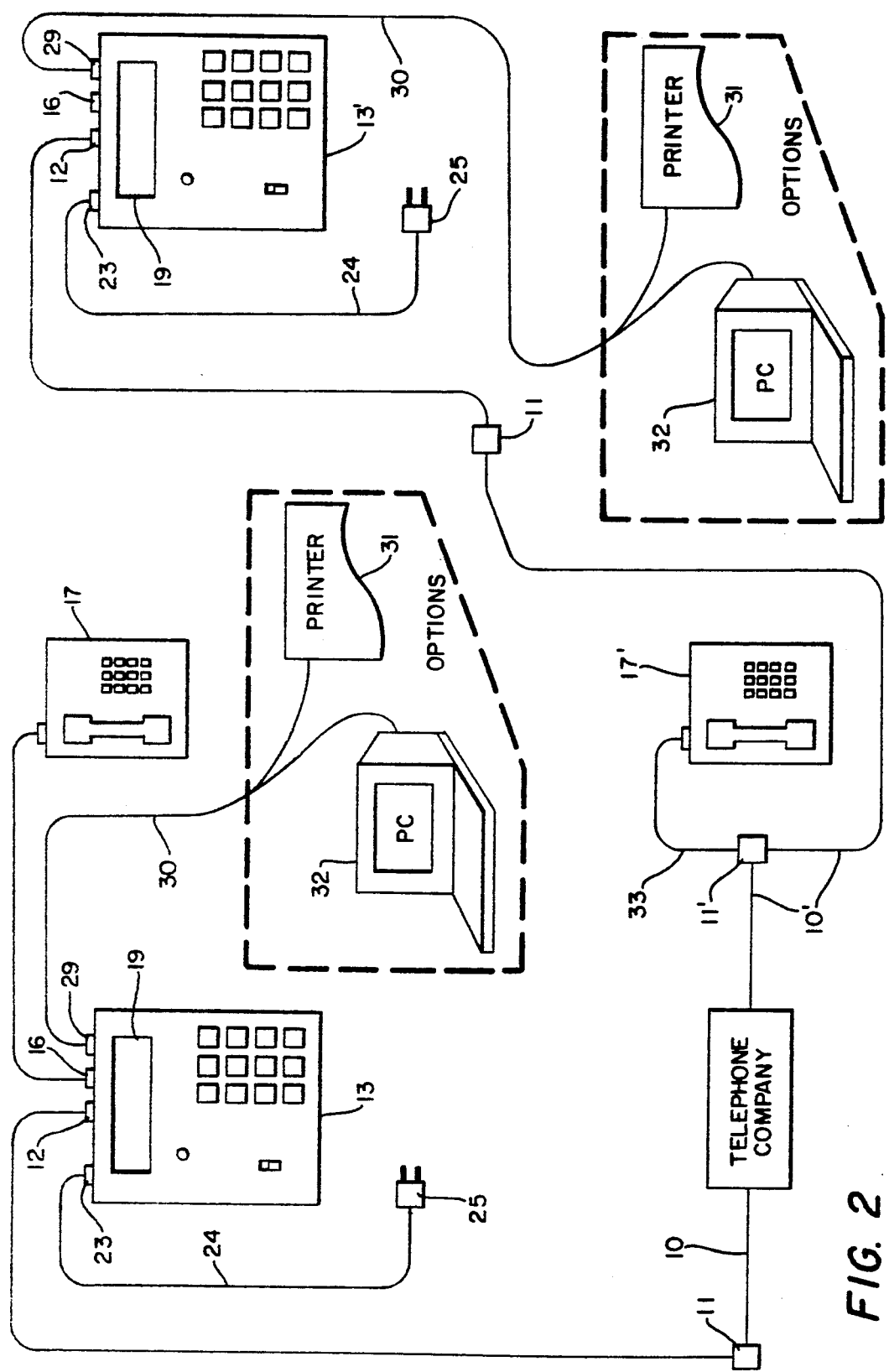
Figure 4B:
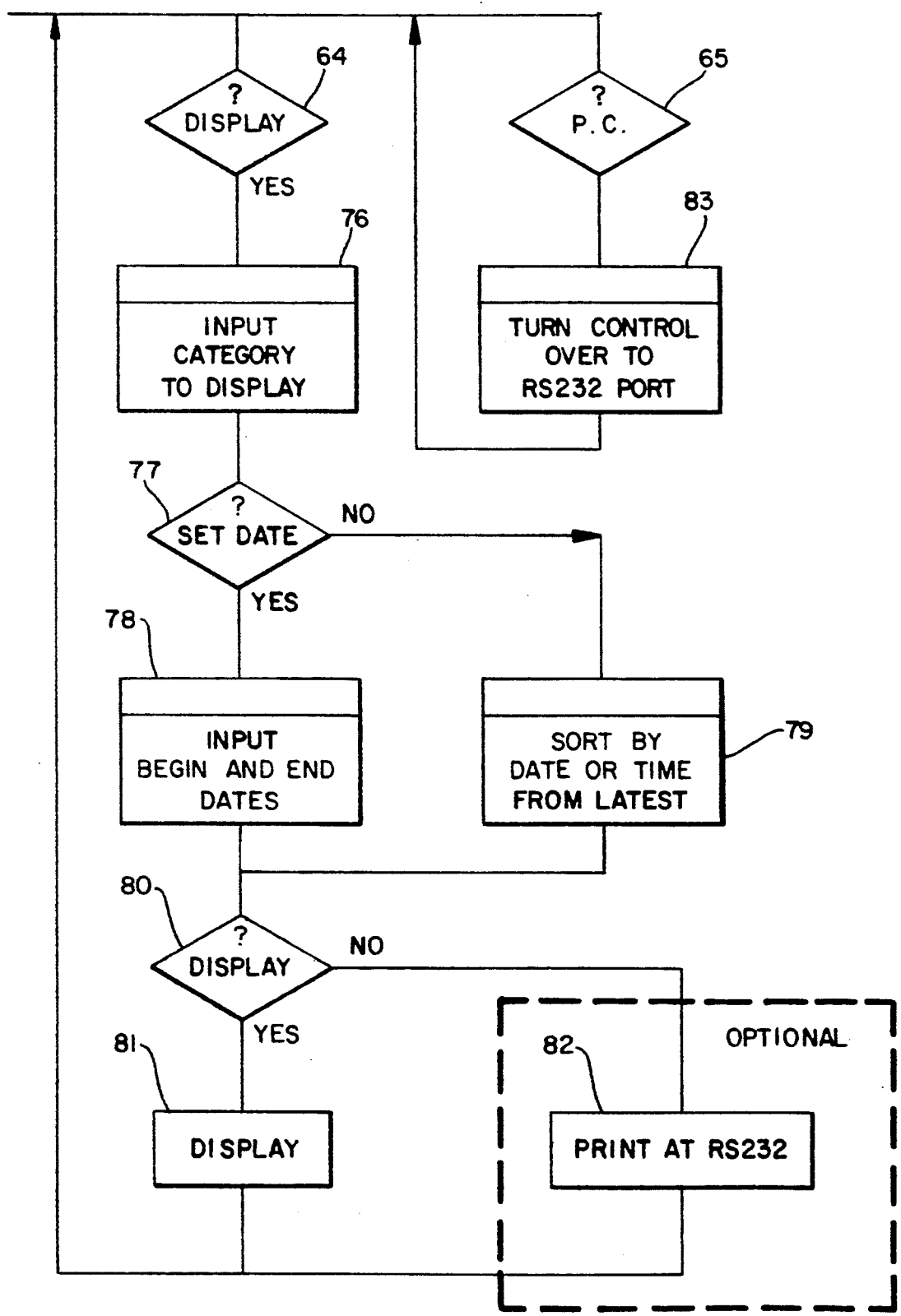

In the drawings:

FIG. 1 represents a functional block diagram of the electronic passive logging system for recording both incoming and outgoing phone calls;

FIG. 2, a block schematic showing of the electronic phone call logging system telephone line hook-up;

FIG. 3, a block schematic interconnect of the electronic phone call passive logging system including a microcontroller (MCU with read only memory, ROM), a random access memory (RAM), a liquid crystal display (LCD), a keypad, a phone line interface circuit section and an RS 232 port for optional connection to a printer and/or a PC unit; and, FIGS. 4A and 4B, a program function diagram of the electronic logging system for recording both incoming and outgoing phone calls.

Referring to the drawings:

In the functional block diagram of FIG. 1 a phone company line 10 is shown connected through a wall phone jack 11 to a jack 12 connection to the electronic logging circuit system box 13 for recording both incoming and outgoing phone calls with phone number, date, time and elapsed time recorded. Within the box 13 the phone line jack 12 is line 14 connected to phone call monitor processor/memory circuit 15 and also through phone line jack 16 to telephone 17. The phone call monitor processor/memory circuit 15 has output connection 18 to display 19 such as a liquid crystal display (LCD) and a twelve volt direct current (DC) power input through line 20 from DC power supply 21 that is also connected as a DC power input through branch line 22 to display 19. DC supply 21 has a through the wall connector 23 to line 24 from AC power source 25. A stand by battery 26 is connected through line 27 to DC supply 21 so that when power is lost, other than being switched off, the phone call monitor processor/memory circuit 15 will initiate battery powered operation. Under battery powered operation a loss of power indicator will illuminate, the display 19 will be deactivated and the power-down information date, time and the power down message is entered to the "power-down" location in memory. The phone call monitor processor/memory circuit 15 also has a RS 232 port line 28 connection to through the wall connection 29 and line 30, optionally, to printer 31 and/or PC (personal computer) 32.

Referring also to the telephone line hook-up showing of FIG. 2, the electronic phone call (both incoming and outgoing) logging system box 13 is the same as that of FIG. 1. The electronic phone call logging system box 13' is also substantially the same as box 13 with, however, the line 10' from the telephone company having a "T" connection jack 11' and line 33 connection to telephone 17' separate from a telephone 17 being connected through phone line jack 16 that, while not shown, could be so connected as an additional phone connected to the same phone company line 10'.

Referring now to more detailed block schematic FIG. 3 electronic phone call passive logging monitor processor/memory circuit 15 contained within system box 13 the phone line 10 is connected through lines 14A, 14B and 14C through line buffer amplifier 34A as an input to signal pulse shaper circuit 35, on/off hook signal circuit 36, ring detect circuit 37 and answer detect circuit 38. The phone line 10 is also connected through line buffer amplifier 34B as an input to the call number decoder (CND) circuit 39 (call ID), and also through line buffer amplifier 34C as an input to dual tone multi-frequency (DTMF) convertor circuit 40 in a line interface section 41 of circuit 15. An address/data buss system 42 interconnects the signal pulse shaper circuit 35, on/off hook signal circuit 36, ring detect circuit 39, answer detect circuit 38, CND decoder circuit 39 and DTMF converter circuit 40 to a microcontroller with read only memory (ROM) circuit 43 and to the RS 232 port 44 having connection through line 30, optionally to printer 31 and/or PC (personal computer) 32. A read/write interrupt drive (R/W/INT) interconnect line 45 interconnects pulse shaper 35, on/off hook 36, ring detect 37, answer detect 38, CND decoder 39, DTMF converter 40 and the microcontroller with ROM 43. The pulse shaper circuit 35 that sharpens pulses generated by rotary dial phone when such a phone connected to phone line 10 is used, provides a pulse stream through line 46 to the microcontroller with ROM circuit 43. An address/data buss 47 interconnects microcontroller with ROM circuit 43 and randome access memory (RAM) 64K×8 BIT circuit 48, and a read/write (R/W) line 49 from the circuit 43 is input connected to the RAM circuit 48. A twelve key keypad 50, like a phone pad, is data output buss 51 connected for feeding data punched into keypad 50 to the microcontroller with ROM circuit 43. Please note that keypad 50 could be expanded with additional function keys such as, for example, to a sixteen key keypad. An address/data buss 52 interconnects microcontroller with ROM circuit 43 with display 53, that is a liquid crystal display (LCD), displaying phone number, date, time, and elapsed time (E.T.). A read/write (R/W) line 54 from the circuit 43 is input connected to the display 53. An output line 55 from microcontroller with ROM circuit 43 is connected to buzzer 56 to generate a buzz when a call is with a name in the directory memory or if there is no caller ID (CND). The memory scheme chart 57 with FIG. 3 diagrams the format of phone call phone number, date time, and elapsed time (E.T.) of calls stored in the electronic phone call passive logging monitor processor/memory circuit 15 and displayable when and as called for on display 53 and/or PC 32 or for print out by printer 31.

The electronic phone call passive logging monitor processor/memory circuit 15 that includes a built in clock/timer, constantly monitors the phone line 10 for phone calls. When the handset is lifted the circuit 15 listens for and stores the number dialed. As soon as the called party answers the elapsed timer starts. If within a set time the call is terminated, circuit 15 assumes no answer, or a wrong number has been dialed, and holds the number, date and time only. As the conversation goes further the timer continues until the call is completed. This time is displayed during the call as a reminder of the passing time. When the call is completed the number called, time, date and elapsed time are stored for future reference. When the ring monitor detects ring activity and no number has been dialed, an incoming call is assumed. At this time the call is handled the same as outgoing calls, except that only the date, time and elapsed time are stored. A new "Caller Identification" feature available from some phone companies, can allow circuit 15 to also store incoming phone numbers. A "Frequent Caller Directory" is incorporated so that the caller's name will be displayed and a light emitting diode (LED) will flash before the call is answered. A printout of stored information can be obtained, with the touch of a few keys, at any time. This can be all calls, or any portion by dates. Even unanswered and wrong numbers are available for comparison to the phone bill. The circuit 15 will be microprocessor controlled for high-speed, accurate data collection with no phone line interference. Power is supplied by an external low voltage powerpack similar to those supplied with transistor radios.

Refer now to the program function diagram, of FIGS. 4A and 4B, of the electronic logging system for logging (i.e. monitoring) both incoming and outgoing phone calls. With power first applied (start 60) the phone call monitor processor/memory circuit 15 is memory initialized along with input devices and registers. Time and date are entered from the keypad 50 as indicated in function block 61. This being initialized information is applied to an incoming, function question control "Incoming" 62, "Off hook" 63, "display" 64 and to PC 65, and with the output from 62 applied to call number 66 function decision step. If it is yes there is a call number the call number, date and time is provided to that identified function 67, if no the date and time is provided to the incoming call in function 68 with one or the other of these applied to the off hook function step 69. The "no" result of function step 69 is passed to the move information to the wrong/unanswered number location function 70. The off hook function 63 if yes initiates number, date and time to outgoing call function 71 initiating answer function 72 with a "yes" result passed along with or independently from any "yes" result of answer function 72 or off hook function 69 is applied to wrong number function 73. The yes result of function 73 is also applied to move information to the number to wrong/unanswered location function 70, and a no result of the answer function 70. Upon completion of function 70 the processor reopens functions 62, 63, 64 and 65 in being applied back to the output feed pathway from function 61 and to all function steps connected thereto. A function output of wrong number function 73 is applied for the start and display timer function 74 that in turn activates the detect onhook store number date, time and elapsed time (E.T.) function 75. Upon completion of function 75 the processor reopens functions 62, 63, 64 and 65 in being applied back to the output feed pathway from function 61 and to all the function steps directly connected thereto. The "yes" result from display function 64 is passed to input category to display function 76 with action results applied to set date function 77 with yes and no resultant outputs, with the yes result applied to the input begin and end dates functions 78, and the no result to the sort by date or time from latest function 79. The results of either functions 78 and 79 are passed to display function 80 having yes or no resultant outputs, with the yes result applied to display function 81 and the no result applied to the print at RS232 function 82 (an optional function). Upon completion of either function 81 or 82 the processor reopens functions 62, 63, 64 and 65 in being applied back to the output feed pathway from function 61 and to all function steps connected thereto. The function result of PC function 65 is passed to turn control over to RS232 port function 83. Upon completion of function 83 the processor reopens functions 62, 63, 64 and 65 in being applied back to the output feed pathway from function 61 and to all function steps connected thereto.

Upon operation initialization when power is first applied, the system initializes memory, input devices and registers. Time and date are entered via the keypad 50. The MCU 43, an interrupt controlled device, detects keyboard interrupt and displays the data on the LCD 53. Upon completion of date and time entry, the MCU 43 clears all interrupt flags and displays current date and clock. With respect to keyboard control the keyboard 50 is the operator-to-MCU interface, through which the date, time, phone numbers and display requests are entered. Time is set by first pressing the time entry command key followed by the "enter" key. This sets the MCU to accept the next four character inputs as the 24-hour-clock time. The MCU automatically positions the information in the "time" space on the LCD display 53, inserting a colon(:) between the hour and minute. The clock will start when the "execute" key is depressed. Date entry is executed same as time, with a "mmddyy" format. Here again, the MCU positions the data in the correct area on the display. Either Date and Time can be updated at any time. The personalized directory is stored by first entering the ten-digit phone number followed by up to ten characters of the person's name. The # and * keys are used along with the number keys to input the characters.

In placing a call when the phone line signals an "off-hook" level the "off-hook" interrupt goes active. The MCU looks for a pulse stream or parallel DTMF data. If a ten-pulse-per-second stream from the pulse shaper is detected, a valid pulse-dial is assumed. The number dialed is set when the time between pulses is greater than one tenth of a second. This set of pulses is input and converted to a parallel data character. The characters are then stored in outgoing-call memory cache along with the current date and time. DTMF characters are interrupt controlled. As the DTMF converter detects and outputs each new character, DTMF interrupt is set. The data is transferred parallel from the DTMF converter through the MCU register to the current memory location. Again, Date and Time are stored after dialing is complete. While the phone number is being dialed each number is displayed sequentially until the complete number is dialed and displayed. After the last number is dialed, the phone line "ring" level will set the "ring detect" interrupt. The MCU starts the Elapse Timer and displays it on the LCD. If a busy tone is detected a "busy" interrupt will be set, and the call will be labelled as such. The timer will continue until on-hook interrupt is detected. At this time a decision is made. If on-hook occurs within a set time, a wrong number or no answer is concluded. The number and time are moved to the wrong-number/no-answer location in memory. Otherwise, a completed call is processed. The elapsed time is moved to the currently open call location.

When receiving a call ring activity occurring on the phone line sets the "ring-detect" interrupt. The MCU outputs date and time to the current incoming-call memory cache. Off-hook interrupt is activated when the phone is answered. This starts the elapse timer, which is displayed on the LCD readout. Upon completion of the call, on-hook interrupt occurs, signalling the MCU to store elapsed time in the open incoming-call memory cache. If ring activity stops before an off-hook interrupt is detected, the MCU moves the date-time information to the incoming unanswered/wrong-number area. If incoming-caller-ID function is active, CND decoder will input the caller's phone number to the current incoming call cache during ring activity, and the MCU will display it for the duration of the call. If the number is found in the onboard directory, the directory name will be displayed in place of the number and an indicator light will flash and/or a ringer will sound while the phone is ringing. With "CND" active, the CPU will activate the ringer with another tone when the caller's number is blocked.

Upon call completion or completion of any activity, indentified by an on-hook interrupt or the ending of ring activity on unanswered incoming, interrupt flags and registers are reset, date and time are redisplayed, the current memory is incremented to the next call cache, the appropriate call counters are incremented, and the MCU goes to standby. If, on outgoing calls, "on-hook" interrupt occurs before "ring-detect", "no call" is assumed. The MCU clear the current memory cache, resets interrupts and waits for the next call activity. Call counters are not incremented.

With respect to call display previous call information can be recalled and displayed at any time. By entering the appropriate two-character command, call information can be retrieved by date, date/time, phone number, area code or party called if directory is available. At first the LCD indicates your requested sort (i.e. phone #, date, etc.). After "enter" is input the MCU searches memory for first call fitting the sort key. The first call on the date entered is the first call to be displayed. As "enter" is depressed the next consecutive call is displayed, continuing on until the last call is displayed, or until the "stop" command is entered. Phone number sort requests are displayed starting with the most recent call and working back.

In considering computer-interface on suitably equipped units, interfacing takes place via the RS232 port 44. Installation and operating instructions are included with the RS232 accessory package. The operation and call accessing are controlled from the host computer keyboard. Call information is retrieved by CMU interrupts and commands executed by the "enter" character. All, or any portion of, the stored calls can be output at a time. They can be sorted by phone number, date-start/stop, area code, and/or person's name if a directory is available. Upon power downage when the system is switched off, the microcmputer 15 enters its power off routine. The date, time and power down message is entered to the "power-down" location in memory. All current activities are terminated, including storing contents of any active registers. When power is lost, other than switched off, the system will enter its battery-power operation. A loss of power indicator will illuminate, the display will be deactivated and the same power-down information will be stored. All phone line activity will continue to be monitored with the length of operation dependent on battery life condition.

Whereas this invention has been described with respect to an embodiment thereof, it should be realized that various change may be made without departing from the essential contributions to the art made by the teachings hereof.

I claim:

1. A telephone line activity, both incoming and outgoing calls, passive monitoring system comprising: microcomputer means; read only memory (ROM) means mounted with said microcomputer means circuit connected for control by an on-board program contained in said ROM; random access memory (RAM) means in said system; circuit means interconnecting said RAM means and said microcomputer means; said on-board program carrying ROM having the capacity to work with at least 16K bytes of said random access memory (RAM) divided into at least 16 byte caches allowing for up to at least 500 phone call registers depending upon utilization of available space; phone line to microcomputer signal input means; display means; clock means; keyboard entry means; and said clock means including a clock source feeding said display means; wherein said phone line to microcomputer signal input means includes, on/off hook detecting means; ring detect means, and answer detect means; and circuit means interconnecting said on/off hook detecting means, said ring detect means, and answer detect means and said microcomputer means; said phone line to microcomputer signal input means also includes, a dual tone multi-frequency (DTMF) circuit that decodes dual tones from said phone line to generate binary equivalent numbers as data to said microcomputer and that is an interrupting signal source to said microcomputer circuit means; said circuit means includes an address/data buss system, and a read/write interrupt drive interconnect line, both connected to said on/off hook detecting means, said ring detect means, said answer detect means, and said DTMF circuit; said phone line to microcomputer signal input means also includes, a call number decoder (CND) call ID circuit; and connection of said CND call ID circuit to said address/data buss system, and to said read/write interrupt drive interconnect line.

2. The telephone line call activity passive monitoring system of claim 1, wherein said display means is a liquid crystal display (LCD); and circuit means interconnecting said LCD and said microcomputer means.

3. The telephone line call activity passive monitoring system of claim 1, wherein a first line buffer amplifier interconnects said phone line and said on/off hook circuit, said ring detect circuit, and said answer detect circuit; a second line buffer amplifier interconnects said phone line and said CND decoder circuit; and a third line buffer amplifier interconnects said phone line and said DTMF converter circuit.

4. The telephone line call activity passive monitoring system of claim 3, wherein said phone line to microcomputer signal input means also includes, a pulse shaper circuit for shaping pules emanating from a dial telephone when such a telephone connected to said phone line is used; and said address/data buss system, and said read/write interrupt drive interconnect line are also connected to said pulse shaper circuit; and also a connection of said pulse shape to first line buffer amplifier.

5. The telephone line call activity passive monitoring system of claim 1, wherein RS232 port means is provided connected to said address/data buss system, and to said read/write interrupt drive interconnect line; and enable signal line means extends from said microcomputer to said RS232 port means; and a personal computer (PC) is connected to said RS232 port.

6. The telephone line call activity passive monitoring system of claim 5, wherein a printer is also connected to said RS232 port.

7. The telephone line call activity passive monitoring system of claim 1, wherein a signal generating device is line means connected to said microcomputer means for generating an indicating signal when a call in process is identified with a name stored in the directory memory, and also if there is no caller ID (CND).

8. A telephone line activity, both incoming and outgoing calls, passive monitoring system comprising: microcomputer means; read only memory (ROM) means mounted with said microcomputer means circuit connected for control by an on-board program contained in said ROM; random access memory (RAM) means in said system; circuit means interconnecting said RAM means and said microcomputer means; said on-board program carrying ROM having the capacity to work with at least 16K bytes of said random access memory (RAM) divided into at least 16 byte caches allowing for up to at least 500 phone call registers depending upon utilization of available space; phone line to microcomputer signal input means; display means; clock means; keyboard entry means; and said clock means including a clock source feeding said display means; wherein said phone line to microcomputer signal input means includes, on/off hook detecting means; ring detect means, and answer detect means; and circuit means interconnecting said on/off hook detecting means, said ring detect means, and answer detect means and said microcomputer means; and said phone line to microcomputer signal input means also includes a call number decoder (CND) call ID circuit.

9. The telephone line call activity passive monitoring system of claim 8, wherein said circuit means includes an address/data buss system; and a read/write interrupt drive interconnect line.

10. The telephone line call activity passive monitoring system of claim 9, wherein said phone line to microcomputer signal input means also includes, a pulse shaper circuit for shaping pulses emanating from a dial telephone when such a telephone connected to said phone line is used; and said address/data buss system, and said read/write interrupt drive interconnect line are also connected to said pulse shaper circuit.

11. The telephone line call activity passive monitoring system of claim 10, also including a signal pulse stream line connection from said pulse shaper circuit to said microcomputer.

12. The telephone line call activity passive monitoring system of claim 8, wherein said display means is a liquid crystal display (LCD); and circuit means interconnecting said LCD and said microcomputer means.

13. The telephone line call activity passive monitoring system of claim 12, and including an address/data buss, and a read/write signal line interconnecting said microcomputer with ROM and said LCD display.

14. THe telephone line call activity passive monitoring system of claim 13, wherein said microcomputer is an interrupt signal control means.

15. The telephone line call activity passive monitoring system of claim 8, wherein said microcomputer is an interrupt signal control means.

* * * * *